United States Patent [19]

Long

[11] 4,270,299
[45] Jun. 2, 1981

[54] MOUSE TRAP

[75] Inventor: Alvin L. Long, Long Ranch, Yuba County, Calif.

[73] Assignee: Loring C. Long, Beale A.F.B., Calif.

[21] Appl. No.: 27,315

[22] Filed: Apr. 5, 1979

[51] Int. Cl.³ .............................................. A01M 1/10
[52] U.S. Cl. ........................................... 43/58; 43/62
[58] Field of Search ..................................... 43/58, 62

[56] References Cited

U.S. PATENT DOCUMENTS

| | | | |
|---|---|---|---|
| 68,776 | 9/1867 | Miller | 43/62 |
| 589,183 | 8/1897 | Mariner | 43/62 |
| 641,356 | 1/1900 | Ager | 43/62 |
| 874,654 | 12/1907 | Beaudry | 43/62 |
| 1,668,937 | 5/1928 | Brown | 43/62 |

Primary Examiner—Nicholas P. Godici
Assistant Examiner—J. T. Zatarga

[57] ABSTRACT

The present invention relates to mouse traps, consisting of a first means that employs a spring type striker that is held down by a rod or lever, and a second means that employs a prop to hold up a inverted box or container. The present invention employs the two well known means previously stated to produce a nearly inescapeable mouse trap, the spring type mouse trap that employs a rod or hold down lever to restrain a striker, is placed under a propped up inverted box or container, the spring trap is placed under a string which is attached to the prop on one end and running horizontal over the spring trap and is attached to the box or container side when the mouse trips the spring trap the hold down bar or lever moves upward in a semi circle striking the horizontal string which is attached to the prop, the prop is instantly removed and the box or container drops, at the same instant the spring striker has been released by the rod or lever and in most cases kills the mouse.

8 Claims, 1 Drawing Figure

MOUSE TRAP

SUMMARY

It has been found that one-third of all mice that trip a conventional spring mouse trap somehow escape the striker that is ment to kill them. A mouse that has escaped a trap will be very hard to catch in the future, and will become a ever increasing nuisance in that he will not touch a similar trap again.

The present invention has been tested many times and not one mouse has escaped, the spring striker usually kills two out of three mice, the other one-third are always trapped inside of the falling box or container, the container serves two purposes, one purpose is to restrain a live mouse, whereas the other purpose is to restrain the odor produced by a dead animal and to prevent flys from reaching the dead mouse.

DETAILED DESCRIPTION OF THE DRAWINGS

Figure 1:
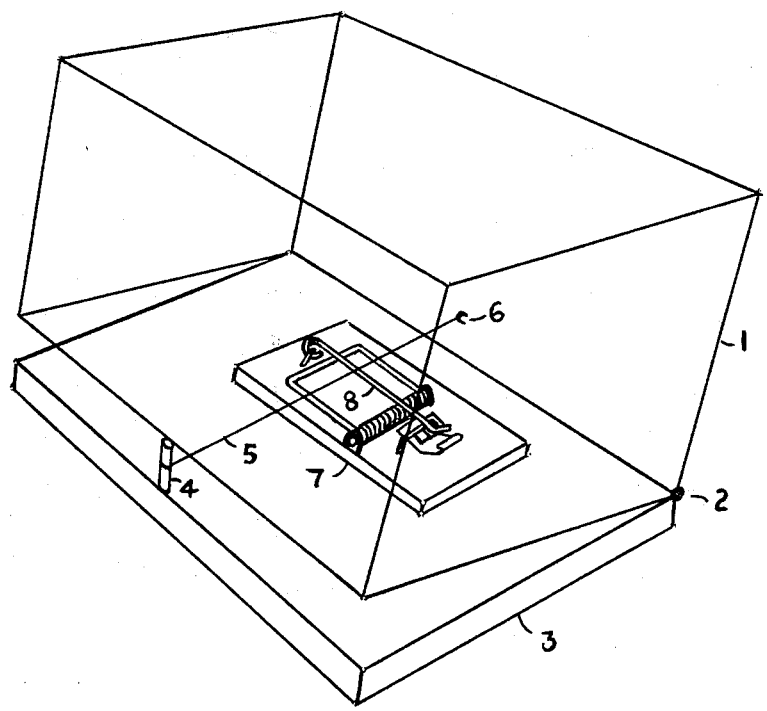
FIG. 1 represents a transparent box that is propped open, and has a spring mouse trap inside of it.

In the drawings FIG. 1 is a transparent box 1 that is hinged 2 to its base 3 and is held open by a prop 4, a string 5 is attached to the prop 4 on one end and to the box side 6 on the other end, a spring mouse trap 7 is shown in a position under the string 5 the hold down rod 8 is shown directly under the string 5, when a mouse trips the spring trap 7 the hold down rod 8 will strike the string 5 and instantly pull the prop 4 out of the opening and the box 1 will drop traping a mouse instantly, to facilitate the function of the box a weight can be placed in the indentation on the box top 9.

What is claimed as new is:

1. A mouse trap comprising; a spring urged pivotal striker element; striker element hold down means; bait holder means releasably attached to said hold down for actuating the pivotal striker element; cover means for covering the striker element, said hold down means and bait holder means and the surrounding vicinity; releasable prop means for holding at least a portion of the cover means above the surface upon which the cover means is set; string means attached at one end to the prop means and at the other end to a surface of the cover on the far side of the striker element opposite the prop means, the string means being strung across the striker element and in the pivotal path thereof, such that a mouse upon entering the area beneath the propped cover means and upon disturbing the bait holder means will actuate the hold down means; striker element and the prop means and if not caught by the striker element will be trapped by the falling cover means as the striker element hold down means hits the string means which dislodges the prop means causing the cover means to fall and trap the mouse.

2. A mouse trap as claimed in claim 1 wherein the cover means is transparent.

3. A mouse trap as claimed in claim 1 wherein the cover means is an open-topped inverted box.

4. A mouse trap as claimed in claim 1 wherein the striker element hold down means is a rod.

5. A mouse trap as claimed in claim 1 wherein there is provided a weight on the cover means.

6. A mouse trap as claimed in claim 1 further comprising a base member upon which the cover means is set.

7. A mouse trap as claimed in claim 6 wherein the cover means is pivotally attached to the base member.

8. A mouse trap as claimed in claim 6 wherein the striker element is pivotally attached directly to the base member.

* * * * *